United States Patent [19]

Asami

[11] Patent Number: 5,506,396
[45] Date of Patent: Apr. 9, 1996

[54] MICROCOMPUTER FOR IC CARD

[75] Inventor: Kazuo Asami, Itami, Japan

[73] Assignee: Mitsubishi Denki Kabushiki Kaisha, Tokyo, Japan

[21] Appl. No.: 193,460

[22] Filed: Feb. 8, 1994

[30] Foreign Application Priority Data

Feb. 9, 1993 [JP] Japan .................. 5-021465

[51] Int. Cl.⁶ ................................. G06K 19/06
[52] U.S. Cl. ................ 235/492; 235/487; 902/1; 902/26; 364/938; 364/938.4
[58] Field of Search ............... 235/492, 487; 364/DIG. 2, 938, 938.1, 938.2, 938.3, 938.4; 380/25, 49, 50; 902/1, 26

[56] References Cited

U.S. PATENT DOCUMENTS

| | | | |
|---|---|---|---|
| 4,650,975 | 3/1987 | Kitchener | 235/492 X |
| 4,777,355 | 10/1988 | Takahira | 235/492 X |
| 4,816,656 | 3/1989 | Nakano et al. | 235/492 X |
| 5,016,212 | 5/1991 | Yamaguchi et al. | 364/900 |
| 5,019,970 | 5/1991 | Yamaguchi et al. | 364/200 |
| 5,039,850 | 8/1991 | Yamaguchi | 235/492 |
| 5,062,075 | 10/1991 | Yoshida et al. | 364/900 |
| 5,126,541 | 6/1992 | Shinagawa | 235/493 X |
| 5,206,938 | 4/1993 | Fujioka | 235/380 X |
| 5,286,962 | 2/1994 | Fujioka et al. | 235/492 |
| 5,293,610 | 3/1994 | Schwarz | 395/425 |

FOREIGN PATENT DOCUMENTS

411255  5/1990  European Pat. Off. .

OTHER PUBLICATIONS

Volker Timm, Elektronik, vol. 37, No. 22, 28, Oct. 1988, Munchen de, pp. 204–208.

Primary Examiner—Donald T. Hajec
Assistant Examiner—Jeffrey R. Filipek
Attorney, Agent, or Firm—Leydig, Voit & Mayer

[57] ABSTRACT

A microcomputer for an IC card arranged so that only a user mode can be performed after the microcomputer has been shipped to a user. Data representing that the microcomputer has been shipped is written at the time of shipment in a test region of an EEPROM. A shipment confirmation routine for confirming whether the shipment data has been written is performed before execution of a branch routine for branching to other programs in accordance with an executed command supplied from outside the microcomputer. If the shipment data has been written in the test region of the EEPROM as confirmed in the shipment confirmation routine, only branching to the user mode is permitted.

4 Claims, 15 Drawing Sheets

MICROCOMPUTER FOR IC CARD

BACKGROUND OF THE INVENTION

1. Field of the Invention

This invention relates to a microcomputer for an IC card and, more particularly, to a microcomputer including a user program for performing various processes and a test program for performing a test (a product test) of the microcomputer.

2. Description of the Related Art

An IC card including a microcomputer of the foregoing type has been disclosed in Japanese Published Patent Application 2-293196. The test program performs a product test to which the microcomputer is subjected, the test program giving access to any arbitrary address of all regions of the microcomputer to perform the function test satisfactorily. The test program is usually used by a manufacturer (of the microcomputer) or an issuer, and execution of the test program and access to the same must be secured by means of collation of passwords or the like after shipment of the IC card in order to prevent abuse of the test program, e.g., giving access to a region of another person's program for copying or falsifying data.

FIG. 13 is a functional block diagram of a conventional microcomputer for an IC card of the foregoing type. Referring to FIG. 13, reference numeral 1 represents a microcomputer for an IC card (hereinafter called a microcomputer for a card), 2 represents a CPU for processing data, 3 represents a mask ROM, a nonvolatile memory in which a variety of programs are stored, 4 represents a RAM, a volatile memory for temporarily storing data, and 5 represents an input/output control circuit for controlling data input to and output from an external device. Reference numeral 6 represents an EEPROM, a write-enable nonvolatile memory for storing data of the results of a process or the like, and 7 represents a bus mutually connecting the foregoing elements. Reference numeral 8 represents a power source terminal (a Vcc terminal), 9 represents a ground terminal (a GND terminal), 10 represents a reset terminal (an RST terminal), 11 represents a clock terminal (a CLK terminal) and 12 represents an input/output terminal (an I/O terminal). The foregoing terminals form a terminal group for establishing electrical contact with an external device.

FIG. 14 is a flow chart of the operation of the conventional microcomputer for a card. FIGS. 15A and 15B illustrate memory maps for the conventional microcomputer for a card. FIG. 15A illustrates a memory map for executing the user program and FIG. 15B is a memory map for executing the test program. Referring to FIGS. 14, 15A, and 15B, a branch routine 34 is performed in step S2 shown in FIG. 14. A user program 31, a test program 32, and a burn-in test program 33 are respectively performed in a user mode (step S3), a test mode (step S5), and a burn-in mode (step S6). A password confirmation routine 35 is performed in a password confirmation routine (step S4). Reference numeral 61 represents a test EEPROM that cannot be accessed from the user mode. The test EEPROM region 61 is realized by using a means for limiting addresses to prevent access thereto in, for example, the user mode. The detailed structure of the test EEPROM region has been disclosed in Japanese Published Patent Application 2-293196. In the password confirmation routine 35, a password to be subjected to a collation with a key code supplied from outside is stored in the test EEPROM region 61. Referring to FIGS. 15A and 15B, the EEPROM 6 and the test EEPROM region 61 are stored in the EEPROM 6, while the branch routine 34, the password confirmation routine 35, the user program 31, the test program 32, and the burn-in test program 33 are stored in the mask ROM 3.

Referring to the flow chart shown in FIG. 14, the microcomputer 1 for an IC card is connected to an external device at the Vcc terminal 8, the GND terminal 9, the RST terminal 10, the CLK terminal 11, and the I/O terminal 12. When a reset signal is received from outside through the RST terminal 10 (step S1), the CPU 2 executes the branch routine 34 previously stored at a predetermined address in the mask ROM 3 (step S2). In the branch routine 34, the branch routine 34 causes branching to the user mode to take place if a user mode execution command has been supplied through the I/O terminal 12 (step S3). In the user mode, serial data supplied from outside is serial/parallel converted by the input/output control circuit 5, the parallel data being then received by the CPU 2 through the bus 7. The CPU 2 processes the data in accordance with the user program 31 so that data that must be temporarily stored is stored in the RAM 4. Data concerning the results of the process or the like, which must always be stored, is stored in the EEPROM 6. Data to be transmitted outside is parallel/serial converted by the input/output control circuit 5 and the serial data being transferred outside through the I/O terminal 12 (step S3).

If a test mode execution command has been received in the branch routine (step S2) through the I/O terminal 12, branching to the test mode (step S5) takes place. Prior to branching to the test mode, the password confirmation routine 35 (step S4) is performed in order to prevent access to the foregoing test program 32. In the password confirmation routine 35, the key code supplied through the I/O terminal 12 and the password previously stored in the test EEPROM region 61 in the EEPROM 6 are collated with each other. If they agree, branching to the test mode (step S5) is permitted so that the test is performed in accordance with the test program 32. The test program 32, as described above, accesses any arbitrary address so that the CPU 2 gives access to each address in accordance with the test program 32 to perform the product test. If the key code and the password do not agree in the password confirmation routine 35 (step S4), branching to the test mode (step S5) cannot be performed and, therefore, the operation of the microcomputer for an IC card is stopped.

If a burn-in mode execution command has been supplied through the I/O terminal in the branch routine (step S2), branching to the burn-in mode (step S6) takes place so that the CPU 2 performs any one of a burn-in test selected from a group consisting of a read-only burn-in test, a write burn-in test, and a dummy write burn-in test by selecting a mode in accordance with the burn-in test program 33.

Since the conventional microcomputer for an IC card has been constituted as described above, the test program can be performed even after the shipment if the test mode execution command has been supplied in the branch routine and if the key code supplied from outside and the password agree by chance in the password confirmation routine. In this case, there arises a problem in that access to data of another person can be obtained through the test program and, therefore, the data can be copied or falsified. Further, similar to the test program, the burn-in test program having access to any arbitrary address in all regions of the microcomputer is provided with no security means against the execution of and access to the burn-in test program. Therefore, branching to the burn-in test program can easily be performed simply by inputting a burn-in mode execution command in the branch routine, causing a problem in that access to data of another person can be given through the burn-in test program.

There arises another problem in that the burn-in mode has no means for detecting whether a mode has been normally selected during the execution of the burn-in test.

SUMMARY OF THE INVENTION

The present invention is directed to overcoming the foregoing problems and, therefore, an object is to produce a reliable microcomputer for an IC card in which branching is limited to a user mode after the microcomputer has been shipped to a user.

In order to achieve the foregoing object, according to the present invention, there is provided a microcomputer for an IC card comprising a mask ROM storing a user program, a test program and a branch routine for selectively branching to the programs in accordance with an execution command branch; a CPU for processing data in accordance with the branch routine and the programs stored in the mask ROM; a RAM for temporarily storing data; an EEPROM storing data and including a test EEPROM region that cannot be accessed from the user program; an input/output control circuit for controlling input/output of data to and from outside; a terminal group for establishing external electrical connections; and a bus mutually connecting the elements, wherein the mask ROM includes a shipment confirmation routine performed before the branch routine is performed, the test EEPROM region includes a region in which shipment data representing that the microcomputer has been shipped is written, and branching to the user program takes place without exception if confirmation has been made in the shipment confirmation routine that the shipment data has been written in the test EEPROM region.

According to the present invention, there is provided a microcomputer for an IC card comprising a mask ROM storing a user program, a test program and a branch routine for selectively branching to the programs in accordance with an execution command; a CPU for processing data in accordance with the branch routine and the programs stored in the mask ROM; a RAM for temporarily storing data; an EEPROM storing data and including a test EEPROM region that cannot be accessed from the user program; an input/output control circuit for controlling input/output of data to and from outside; a terminal group for establishing external electrical connections; and a bus mutually connecting the elements, wherein the terminal group includes a power source terminal, the microcomputer comprises voltage detection means for detecting whether the power supply voltage at the power source terminal has decreased, the mask ROM includes, before the branch routine, a shipment confirmation routine and a voltage detection routine for detecting the power supply voltage of the power source terminal before or after the shipment confirmation routine has been performed, the test EEPROM region includes a region in which shipment data representing that the microcomputer has been shipped is written, and branching to the user program takes place without exception when a decrease in the power supply voltage at the power source terminal has been detected in the voltage detection routine even if the shipment data has not been written in the test EEPROM region.

According to the present invention, there is provided a microcomputer for an IC card comprising a mask ROM storing a user program, a test program, a burn-in test program and a branch routine for selectively branching to the programs in accordance with an execution command; a CPU for processing data in accordance with the branch routine and the programs stored in the mask ROM; a RAM for temporarily storing data; an EEPROM storing data and including a test EEPROM region that cannot be accessed from the user program; an input/output control circuit for controlling input/output of data to and from outside; a terminal group for establishing external electrical connections; and a bus mutually connecting the elements, wherein the mask ROM includes a burn-in data confirmation routine performed before branching to the burn-in test program takes place, the test EEPROM region includes a region in which burn-in data for previously declaring that the burn-in test program has been executed is written, and branching to the burn-in test program takes place without exception if the burn-in data has not been written in the test EEPROM region.

According to the present invention, there is provided a microcomputer for an IC card comprising a mask ROM storing a user program, a test program, a burn-in test program having a plurality of modes and a branch routine for selectively branching to the programs in accordance with an execution command; a CPU for processing data in accordance with the branch routine and the programs stored in the mask ROM; a RAM for temporarily storing data; an EEPROM storing data and including a test EEPROM region that cannot be accessed from the user program; an input/output control circuit for controlling input/output of data to and from outside; a terminal group for establishing external electrical connections; and a bus mutually connecting the elements, wherein the terminal group includes an input/output terminal, and the burn-in test program includes a discrimination signal output step in which a mode discrimination signal representing the mode, among the plurality of the modes, which is being executed, is transmitted through the input/output terminal.

A microcomputer for an IC card according to the invention is arranged in so that the shipment confirmation routine is performed before the branch routine is performed. Therefore, branching in the shipment confirmation routine is limited only to the user mode after the microcomputer for an IC card having the shipment data written in the test EEPROM region has been shipped.

A microcomputer for an IC card according to the invention also includes voltage detection means and a voltage detection routine. Therefore, even if branching to the user mode is performed in the shipment confirmation routine, branching to the user mode is performed in the voltage detection routine when a reduction in the power supply voltage has been detected.

A microcomputer for an IC card according to the invention includes a burn-in data confirmation routine performed prior to branching to the burn-in test program. Therefore, the burn-in test program cannot be performed if the burn-in data has not been written on the test EEPROM region. As a result, execution of the burn-in test in accordance with an erroneous execution command is prevented. Therefore, unauthorized execution and access to the burn-in test program can be prevented.

A microcomputer for an IC card according to the invention includes the burn-in test program having a discrimination signal output step in which a mode discrimination signal representing the mode which is being executed is transmitted to the outside through the input/output terminal. Therefore, the current burn-in mode can be detected from outside the microcomputer.

DESCRIPTION OF THE PREFERRED EMBODIMENTS

First Embodiment

Figure 1:
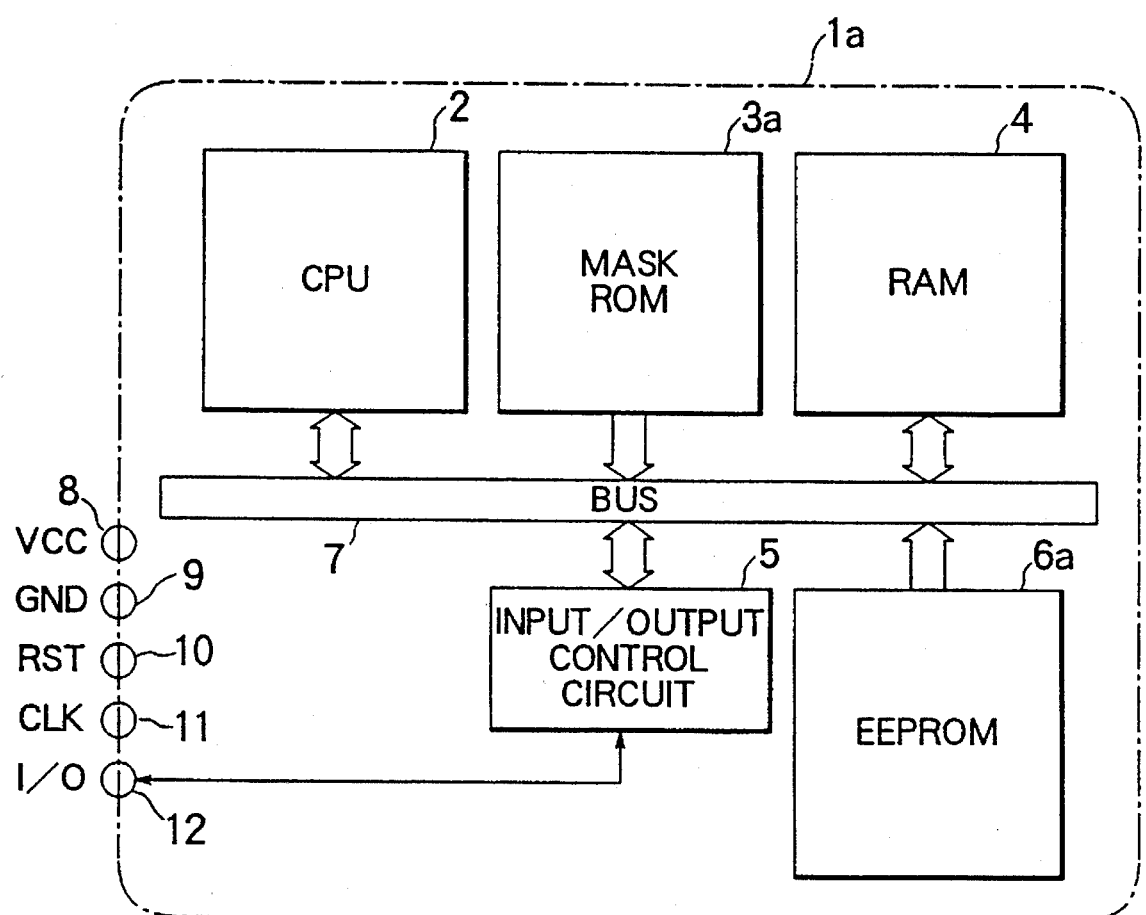
FIG. 1 is a block diagram that illustrates the functions of a microcomputer for an IC card according to the present invention.
Figure 2:
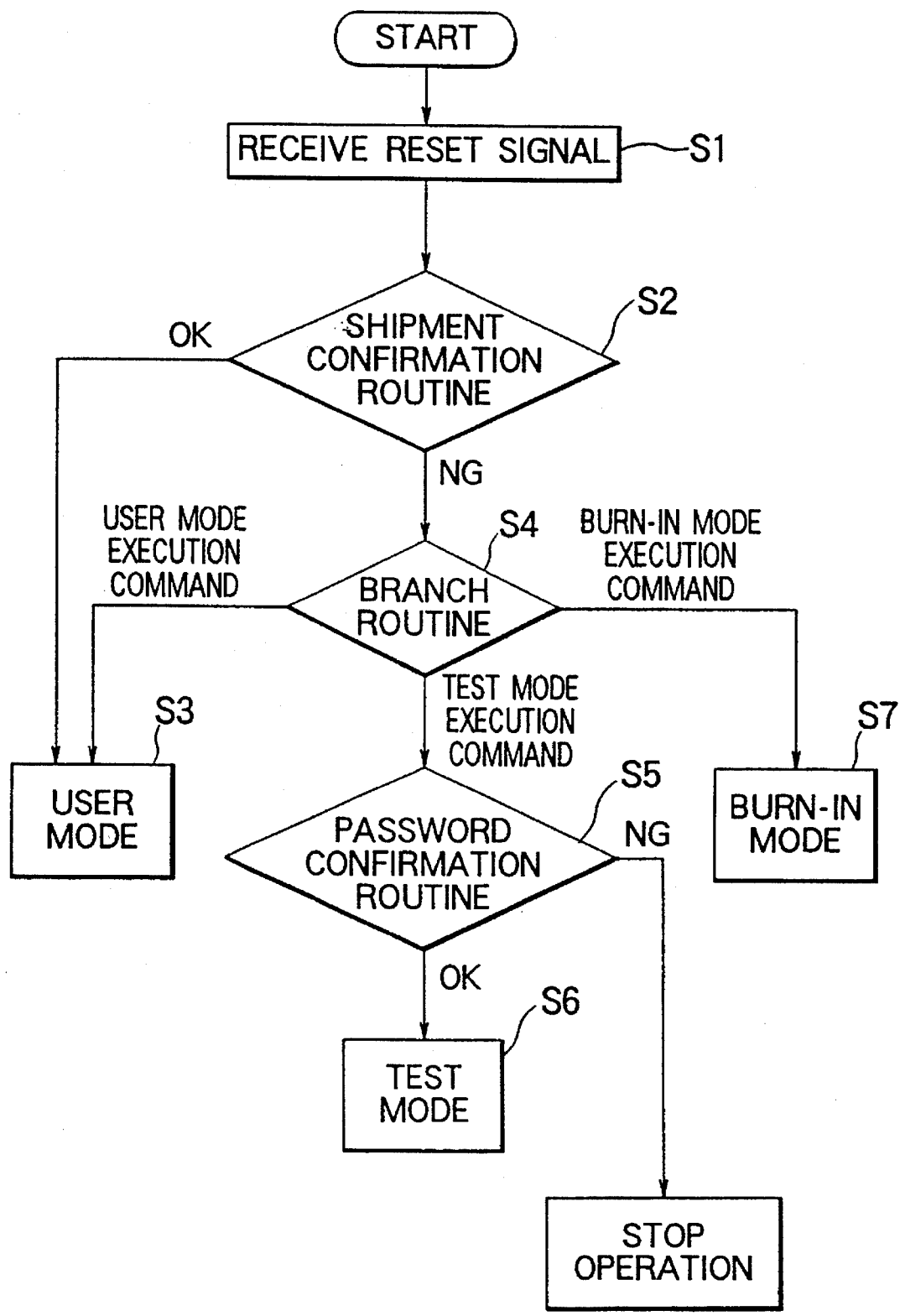
FIG. 2 is a flow chart that illustrates the operation of a microcomputer for an IC card according to the present invention.
Figure 3:
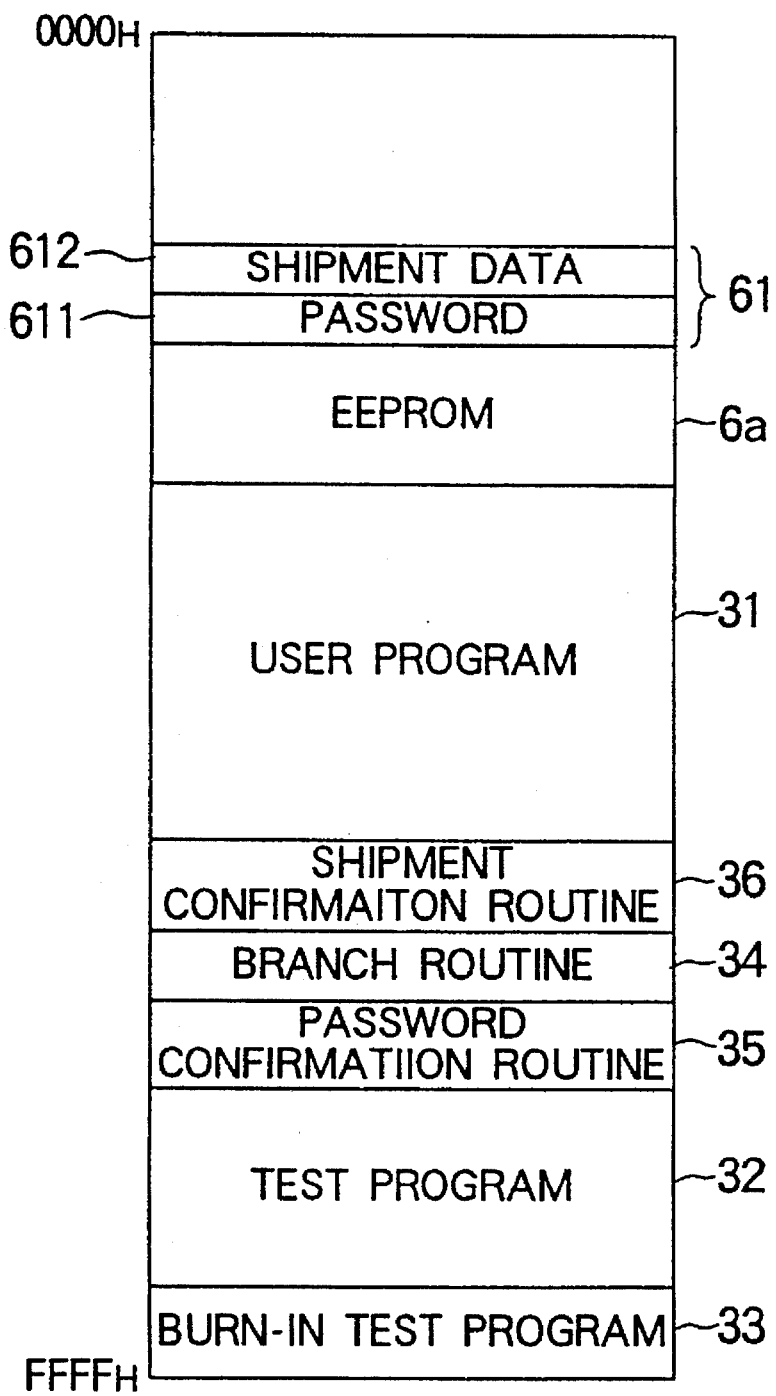
FIG. 3 illustrates a memory map for use at the time of executing a test program in a microcomputer for an IC card according to the present invention.

FIG. 1 is a functional block diagram that illustrates a microcomputer for an IC card according to the present invention. FIG. 2 is a flow chart that illustrates the operation of the microcomputer for an IC card shown in FIG. 1. FIG. 3 illustrates a memory map for use at the time of executing a test program in the microcomputer for an IC card shown in FIG. 1. The elements of the microcomputer 1a for an IC card that are the same or correspond to those of the conventional microcomputer are given the same reference numerals and their descriptions are omitted here. Referring to the drawings, a mask ROM 3a contains the conventional user program 31, the test program 32, the burn-in test program 33, the branch routine 34, the password confirmation routine 35, and a shipment confirmation routine 36 shown in FIG. 3. The EEPROM region 61 of the EEPROM 6a shown in FIG. 3 includes shipment data 612 to be used in the shipment confirmation routine 36 as well as a password code 611 for use in the password confirmation routine 35.

Operation will now be described with reference to the flow chart shown in FIG. 2. Prior to shipment of the microcomputer 1a for an IC card according to this embodiment or an IC card including the foregoing microcomputer, a test mode (step S6) is commenced to execute the test program 32 so that the arbitrary shipment data 612 is written on the test EEPROM region 61. After the shipment data 612 has been written, the microcomputer 1a for an IC card or the IC card including the foregoing microcomputer is shipped. The password 611 is sometimes written simultaneously with the shipment data 612 or sometimes written during the manufacturing process to maintain secrecy of the program between a manufacturer of the microcomputer for an IC card (or the IC card) and an issuer of the IC card.

The operations performed before shipment will now be described. When a reset signal has been received through the RST terminal 10 (step S1), the CPU 2 executes the shipment confirmation routine 36 (step S2) previously stored at a predetermined address in the mask ROM 3a. The shipment confirmation routine 36 determines whether the shipment data 612 has been written in the test EEPROM region 61. Since the shipment data 612 has not been written before the shipment, the process shifts to the branch routine (step S4). The operations from the branch routine 34 (step S4) are the same as those of the conventional technology in that branching is performed in accordance with any one of the mode execution commands supplied externally through the I/O terminal 12 so that the program for each mode is performed.

After the product has been shipped, the shipment data 612 has been written. Therefore, if that writing is confirmed in the shipment confirmation routine 36 (step S2), the process branches to the user mode (step S3). Therefore, branching to the test mode or the burn-in mode is inhibited after shipment. As a result, execution of and access to the test program and the burn-in test program is satisfactorily secured.

Although the foregoing embodiment, similar to the conventional technology, includes the password confirmation routine 35 (step S5) performed before branching to the test mode (step S6), the password confirmation routine 35 (step S5) may be dispensed with, if necessary, because execution of and access to the test program and the burn-in test program are reliably prevented after shipment due to the shipment confirmation routine 36 (step S2).

Second Embodiment

Figure 4:
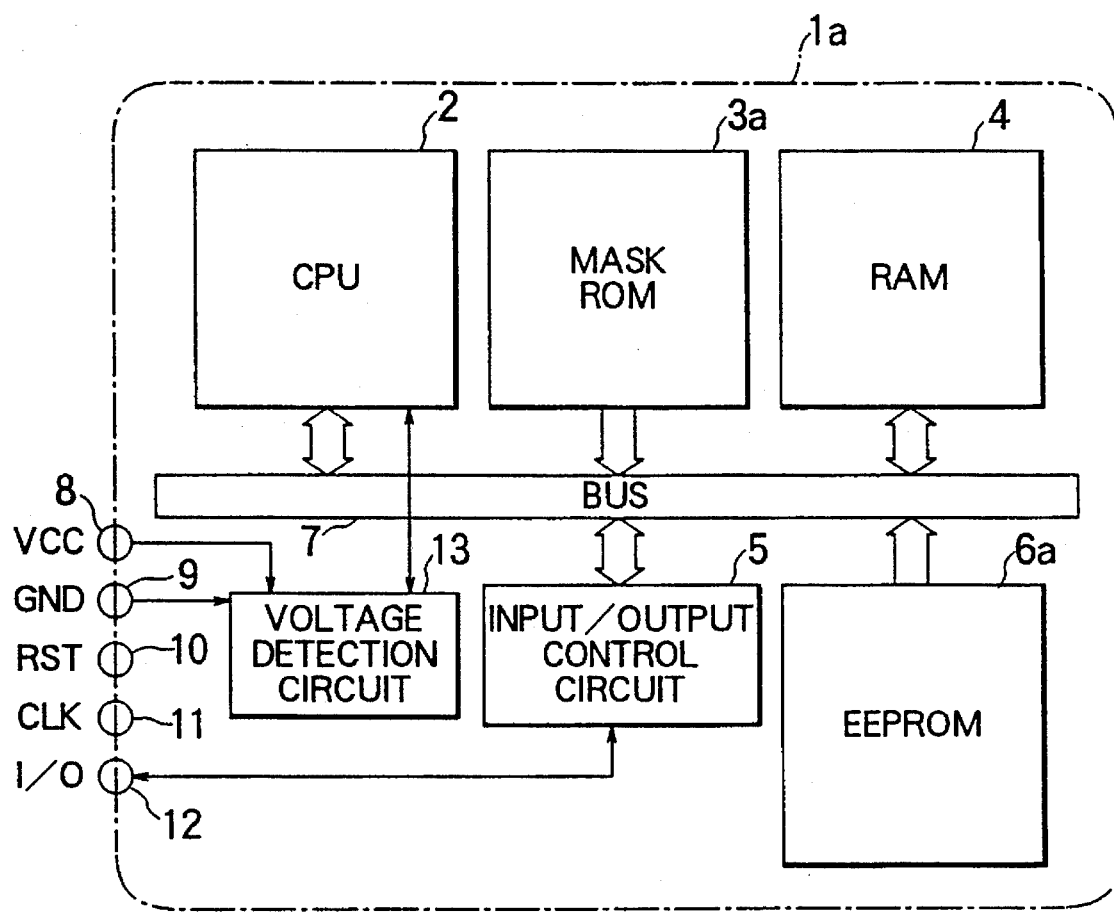
FIG. 4 is a block diagram that illustrates the functions of a microcomputer for an IC card according to the present invention.
Figure 5:
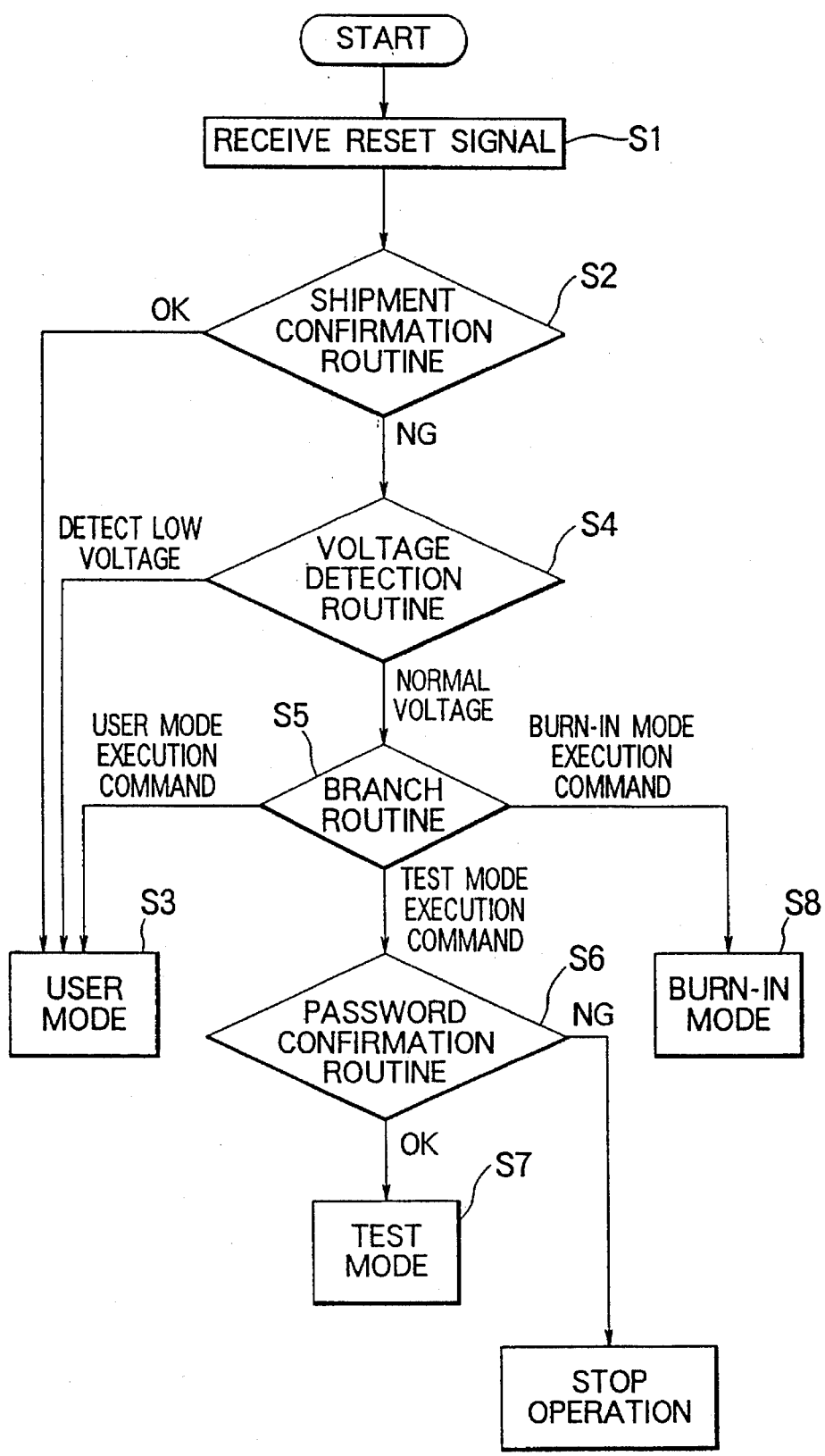
FIG. 5 is a flow chart that illustrates the operation of a microcomputer for an IC card according to the present invention.
Figure 6:
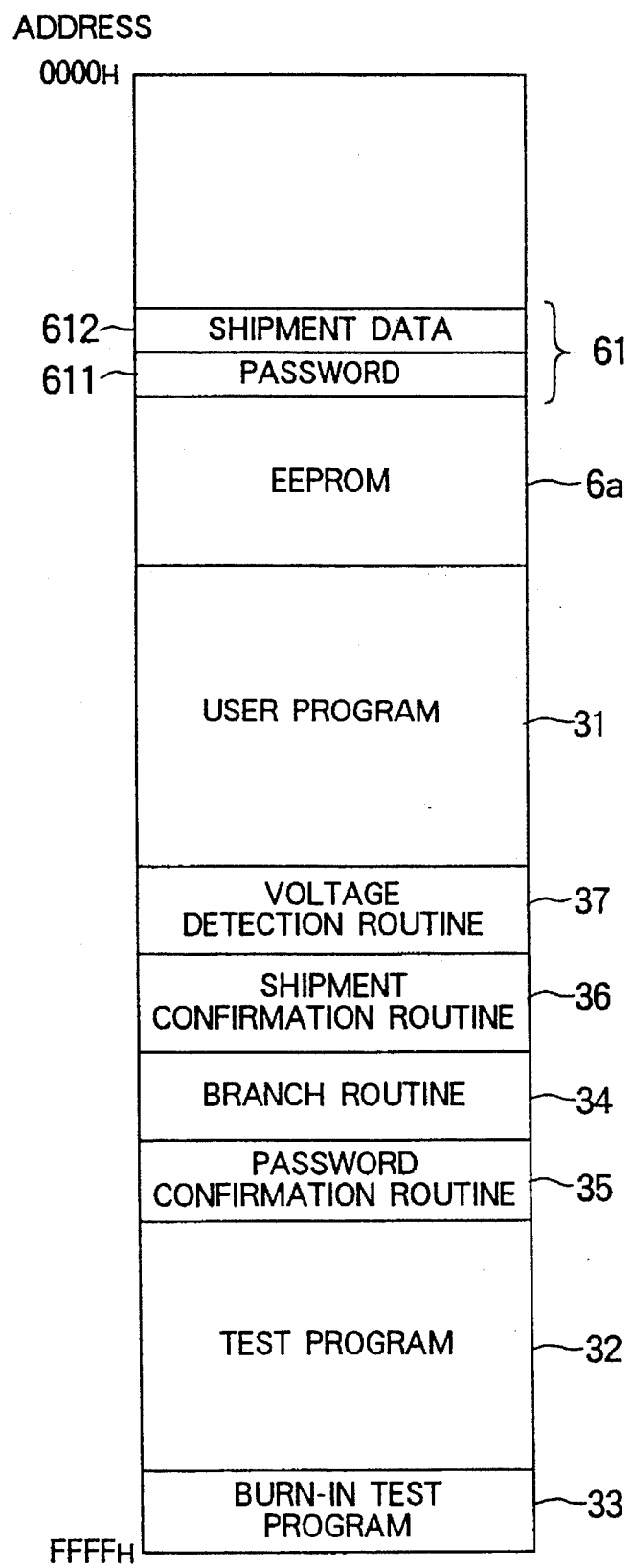
FIG. 6 illustrates a memory map for use at the time of executing a test program in a microcomputer for an IC card according to the present invention.

FIG. 4 is a functional block diagram that illustrates a microcomputer for an IC card according to the present invention. The microcomputer for an IC card according to this embodiment comprises, in addition to the microcomputer for an IC card according to the first embodiment, a voltage detection circuit 13 for detecting whether the power supply voltage at the Vcc terminal 8 has decreased. The voltage detection circuit 13 is arranged to prevent undesirable branching to the branch routine depending upon an erroneous discrimination made in the shipment confirmation routine that no shipment data has been written if the power supply voltage is too low even the shipment data has been written. The voltage detection circuit 13 comprises a known voltage comparator, such as an M5120TL or LP. FIG. 5 is a flow chart that illustrates the operation of the microcomputer for the IC card shown in FIG. 4. FIG. 6 illustrates a memory map for use at the time of executing the test program for the microcomputer the IC card shown in FIG. 4. The operational flow shown in FIG. 5 has a voltage detection routine (step S4) so that the voltage detection routine 37 shown in FIG. 6 is executed. The voltage detection routine 37 is, similar to the shipment confirmation routine 36, included in the mask ROM 3a.

Operation will now be described with reference to the flow chart in FIG. 5. Similar to the microcomputer for an IC card according to the first embodiment, the microcomputer 1a for an IC card according to this embodiment or the IC card including the microcomputer 1a is, prior to shipment, brought into a test mode (step S7) in which the test program 32 is executed so that the arbitrary shipment data 612 is written in the test EEPROM region 61.

Since the operations performed before shipment are the same as those performed in the first embodiment, their description is omitted.

When shipment has been made, a reset signal is supplied through the RST terminal 10 (step S1), the CPU 2 executes the shipment confirmation routine 36 (step S2) previously stored at a predetermined address in the mask ROM 3a. Whether the shipment data has been written in the test EEPROM region 61 is confirmed in the shipment confirmation routine 36. If the confirmation is made, branching to the test mode (step S7) takes place. In this case, branching to the test mode (step S7) and to the burn-in mode (step S8) are inhibited.

If the power supply voltage is too low, although the shipment data 612 has been written on the test EEPROM region 61, an erroneous determination is made in the shipment confirmation routine 36 (step S2) that the shipment data 612 has not been written. Therefore, there is a probability of branching to the branch routine 34 (step S5). Accordingly, the voltage detection routine 37 (step S4) is arranged so that the power supply voltage at the Vcc terminal 8 is detected by the voltage detection circuit 13. If the detected power supply voltage is lower than a predetermined voltage level (low voltage), the discrimination made in the shipment confirmation routine 36 (step S3) is performed. As a result, execution of and access to the test program and the burn-in test program are reliably prohibited after shipment has been made.

Although the voltage detection routine (step S4) follows the shipment confirmation routine (step S2) in the foregoing embodiment, a similar effect can be obtained if the voltage detection routine is performed prior to performing the shipment confirmation routine. Since the foregoing embodiment includes the shipment confirmation routine 36 (step S2) and the voltage detection routine 37 (step S4), execution of and access to the test program and the burn-in test program are reliably secured after shipment. Therefore, the password confirmation routine 35 may be dispensed with, if necessary.

Third Embodiment

Figure 7:
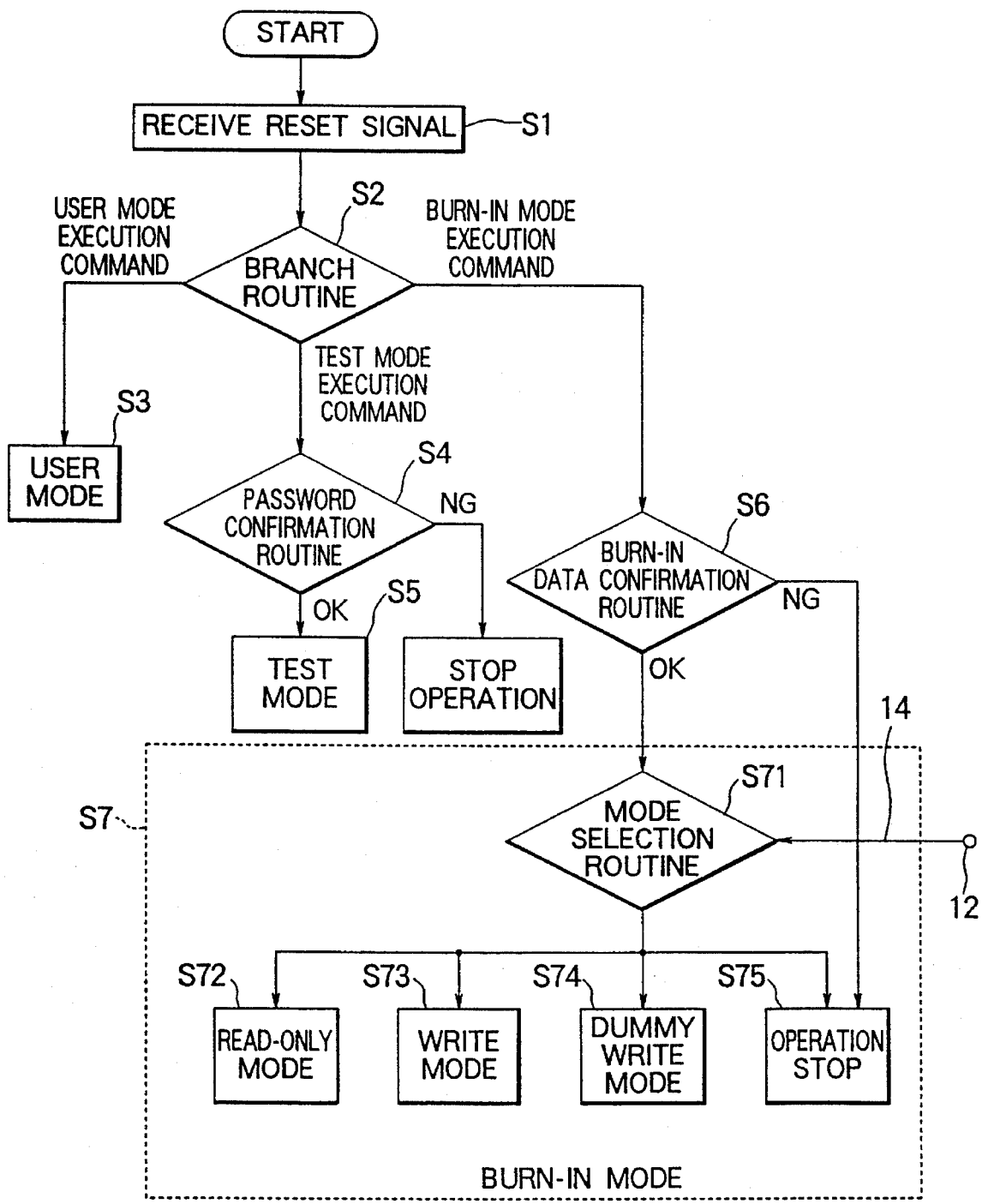
FIG. 7 is a flow chart that illustrates the operation of a microcomputer for an IC card according to the present invention.
Figure 8:
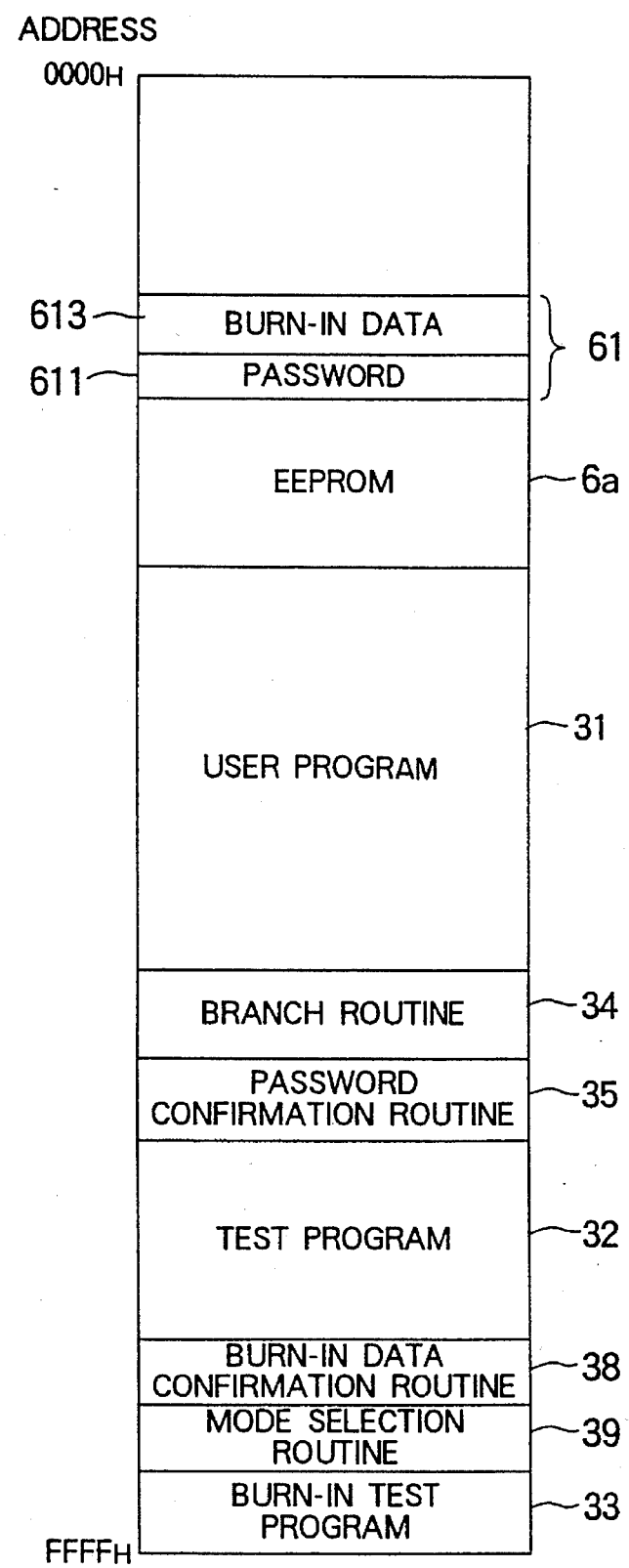
FIG. 8 illustrates a memory map for use at the time of executing a test program in a microcomputer for an IC card according to the present invention.

FIG. 7 is a flow chart that illustrates the operation of a microcomputer for an IC card according to the present invention. FIG. 8 illustrates a memory map to be used at the time of executing the test program for the microcomputer for an IC card according to this embodiment. The functional block diagram adapted to the microcomputer for an IC card according to this embodiment is the same as shown in FIG. 1. The microcomputer for an IC card according to this embodiment is arranged in such a manner that execution of the burn-in test program with an erroneous burn-in mode execution command is prevented and that the execution and access to the burn-in test program are secured.

As shown in the flow chart of FIG. 7, a burn-in data confirmation routine (step S6) is performed before the burn-in mode (step S7) is performed. Moreover, the burn-in mode (step S7) includes step S71, a mode selection routine, step S72, a read-only mode, step S73, a write mode, step S74, a dummy write mode, and step S75, an operation stoppage step. As shown in FIG. 8, the burn-in data confirmation routine 38 and the mode selection routine 39 respectively are performed in step S6 and step S71 in burn-in mode step S7 shown in FIG. 7, the burn-in data confirmation routine 38 and the mode selection routine 39 being stored in the mask ROM 3a. The mode selection routine 39 is included as a portion of the burn-in test program 33. Prior to executing the burn-in test, the burn-in data 613 must be written in the test EEPROM region 61, as shown in FIG. 8.

Operation will now be described with reference to the flow chart shown in FIG. 7. Prior to executing the burn-in test program 33, arbitrary burn-in data 613 is written in the EEPROM region 61 without exception. When the burn-in mode execution command has been supplied from outside through the I/O terminal 12 in the branch routine 34 (step S2), branching to the burn-in mode (step S7) takes place, similar to the operation of the conventional technology. Prior to branching to the burn-in mode, the burn-in data confirmation routine 38 (step S6) is performed. In the burn-in data confirmation routine, confirmation is made as to whether the burn-in data 613 has been written in the test EEPROM region 61. If it has been written, branching to the burn-in mode (step S7) is permitted. If it has not been written, the operation of, for example, the microcomputer for an IC card is stopped (step S75). In the burn-in mode (step S7), a mode selection signal 14 is supplied from outside through the I/O terminal 12 in the mode selection routine 9 (step S71). In response to the thus-supplied signal, any one mode is selected from a group consisting of the read-only mode (step S72), the write mode (step S73), the dummy write mode (step S74), and the operation stoppage (step S75).

Since branching to the burn-in mode is not permitted if the burn-in data is not written in the test EEPROM region 61 in the EEPROM 6a before the burn-in test is performed, execution of the burn-in test program in accordance with an erroneous burn-in mode execution command is prevented. Further, execution of and access to the burn-in test program are reliably secured.

Fourth Embodiment

Figure 9:
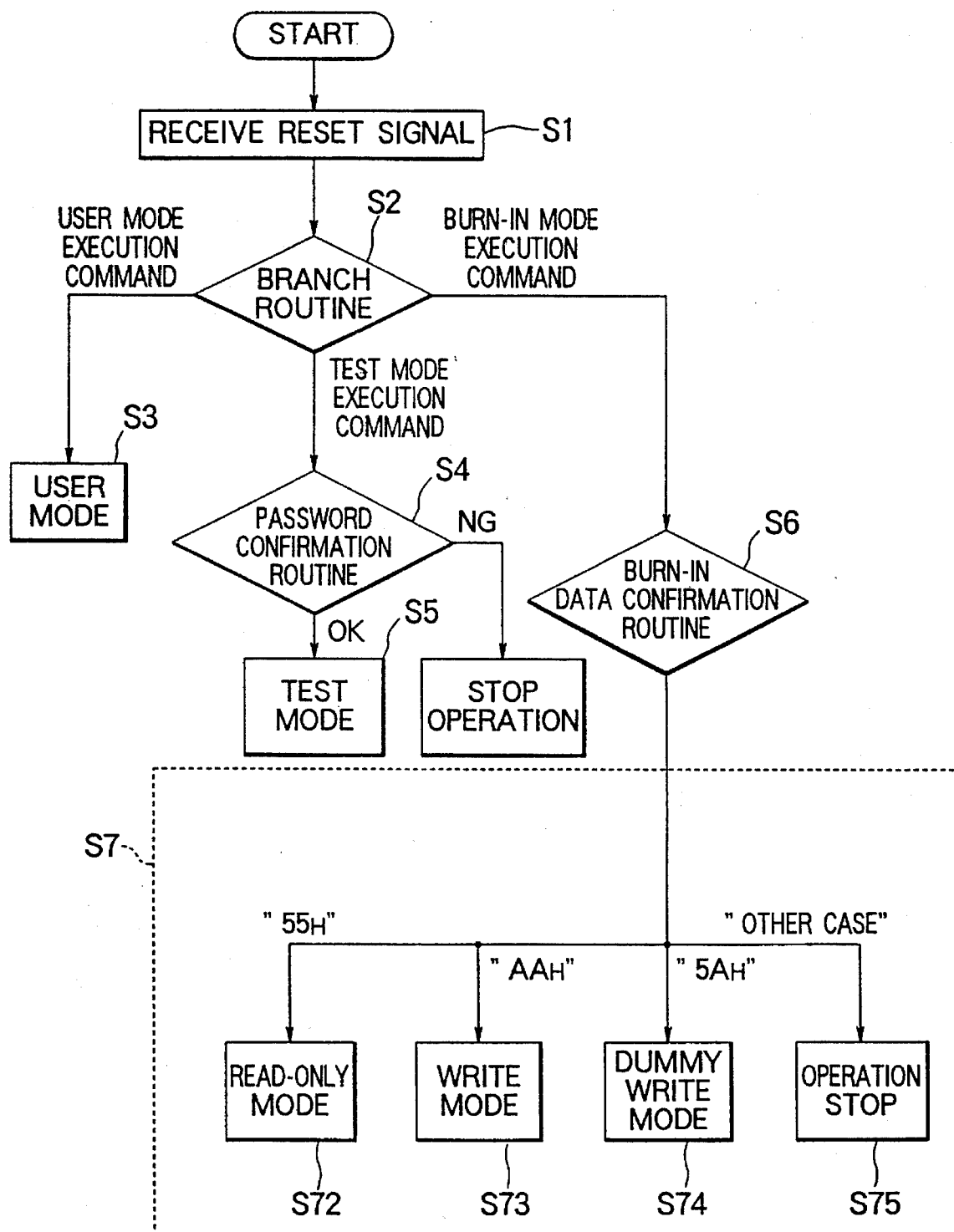
FIG. 9 is a flow chart that illustrates the operation of a microcomputer for an IC card according to the present invention.

FIG. 9 is a flow chart of the operation of a microcomputer for an IC card according to another embodiment of the present invention. The functional block diagram for the microcomputer for an IC card according to this embodiment is the same as that shown in FIG. 1. This embodiment is arranged in such a manner that a mode is selected in the burn-in mode in accordance with the burn-in data 613 according to the third embodiment. Therefore, the memory map according to this embodiment omits the mode selection routine 39 from the memory map shown in FIG. 8. Further, the burn-in data 613 to be written in the test EEPROM region 61 is predetermined data with respect to a mode to be executed in the burn-in mode. If a read-only mode is selected, for example, the burn-in data 613 to be written is $55_H$. If the write mode is selected, the burn-in data 613 to be written is $AA_H$. If the dummy write mode is selected, the burn-in data 613 to be written is $5A_H$.

Operation will now be described with reference to the flow chart in FIG. 9. Prior to executing the burn-in test program 33, the burn-in data 613 for selecting a mode to be executed must be written in the test EEPROM region 61 without exception. If a burn-in test mode execution command has been supplied from outside through the I/O terminal 12 in the branch routine 34 (step S2), branching to the burn-in mode (step S7) takes place. However, the burn-in data confirmation routine 38 (step S6) is performed prior to branching to the burn-in mode. In the burn-in data confirmation routine, reference to the contents of the burn-in data 613 in the test EEPROM region 61 is made. If the burn-in data 613 is $55_H$, the read-only mode (step S72) is executed. If it is $AA_H$, the write mode (step S73) is executed. If it is $5A_H$, the dummy write mode (step S74) is executed. If the burn-in data 613 is other than the foregoing data, operation is stopped (step S75).

As described above, this embodiment is arranged in such a manner that the burn-in data 613 is used to discriminate whether branching to the burn-in mode (step S7) has been permitted and to detect the mode to be selected in the burn-in mode (step S7). Therefore, the necessity of providing a routine for supplying, from outside, the mode selection signal for selecting a mode in the burn-in mode in the mode selection routine (step S71) shown in FIG. 7 according to the third embodiment can be eliminated.

Fifth Embodiment

Figure 10:
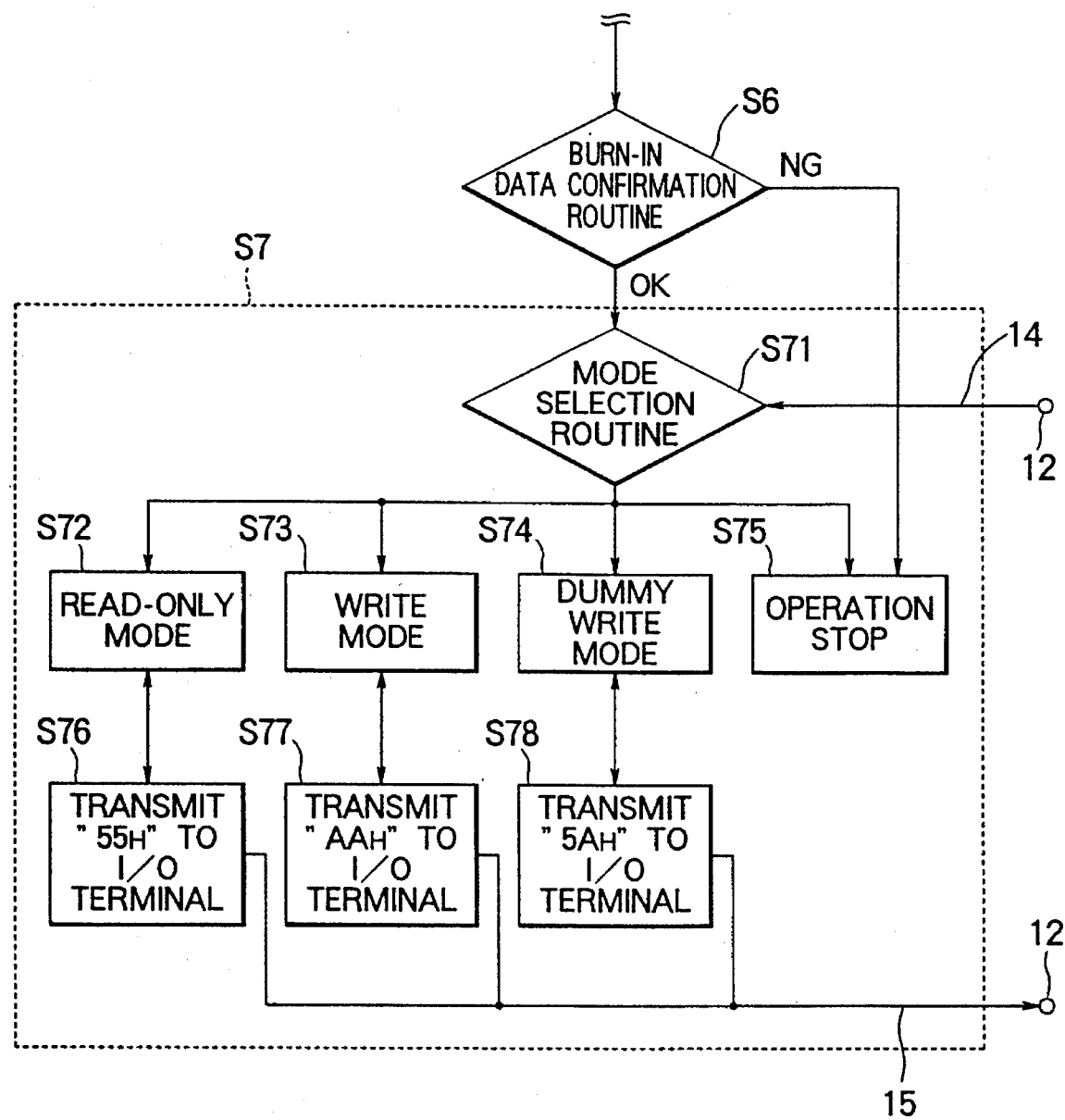
FIG. 10 is a flow chart that illustrates the operation of a microcomputer for an IC card according to the present invention.

FIG. 10 is a partial flow chart that illustrates the operation of a microcomputer for an IC card according to a fourth embodiment of the present invention wherein the branch routine is branched to the burn-in mode. The overall operation is the same as that according to the third embodiment shown in FIG. 7. The microcomputer for an IC card according to this embodiment is arranged so that a discrimination signal representing a mode that is being executed during the execution of the burn-in test is transmitted to an outside terminal. In order to realize this feature, the burn-in test program 33 has a discrimination signal output step (steps S76 to S78) for transmitting to the I/O terminal 12 a mode discrimination signal 15 representing the mode that is being executed. The residual portions are the same as those according to the third embodiment, the functional block diagram is the same as that shown in FIG. 1, and the memory map shown in FIG. 6 is employed.

Operation will now be described with reference to a flow chart shown in FIG. 10. When a burn-in mode execution command is supplied in the branch routine, branching to the burn-in mode (step S7) takes place, similar to the operation of the conventional technology. Prior to branching to the burn-in mode, the burn-in data confirmation routine 38 (step S6) is performed. In the burn-in data confirmation routine, confirmation is made as to whether the burn-in data 613 has been written in the test EEPROM region 61. If it has been written, branching to the burn-in mode (step S7) is permitted. If it has not been written, the operation of, for example, the microcomputer for an IC card is stopped (step S75). In the burn-in mode (step S7), the mode selection signal 14 is, in the mode selection routine 39 (step S71), supplied from outside through the I/O terminal 12. In response to the foregoing signal, a mode is selected from a group consisting of the read-only mode (step S72), the write mode (step S73), the dummy write mode (step S74), and the operation stop (step S75). During execution of the read-only mode (step S72), $55_H$ is, as the mode discrimination signal 15, always transmitted to the I/O terminal 12 (step S76). During execution of the write mode (step S73), $5A_H$ is, as the mode discrimination signal 15, always transmitted (step S77). During execution of the dummy write mode (step S74), $5A_H$ is, as the mode discrimination signal 15, always transmitted (step S78).

By transmitting the mode discrimination signal representing the mode that is being executed in the burn-in test, the mode that is being executed can be determined from outside.

Sixth Embodiment

Figure 11:
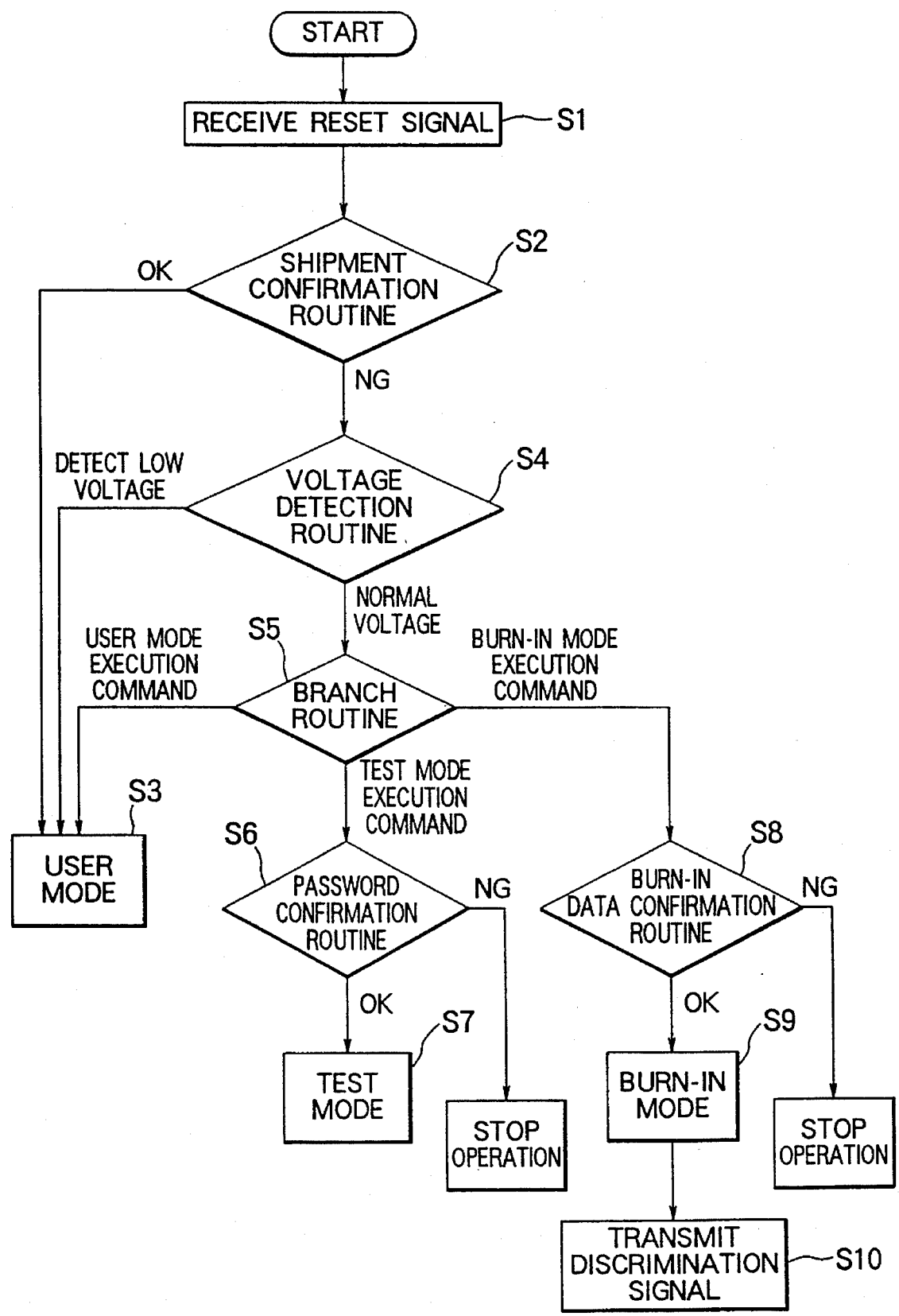
FIG. 11 is a flow chart that illustrates the operation of a microcomputer for an IC card according to the present invention.
Figure 12:
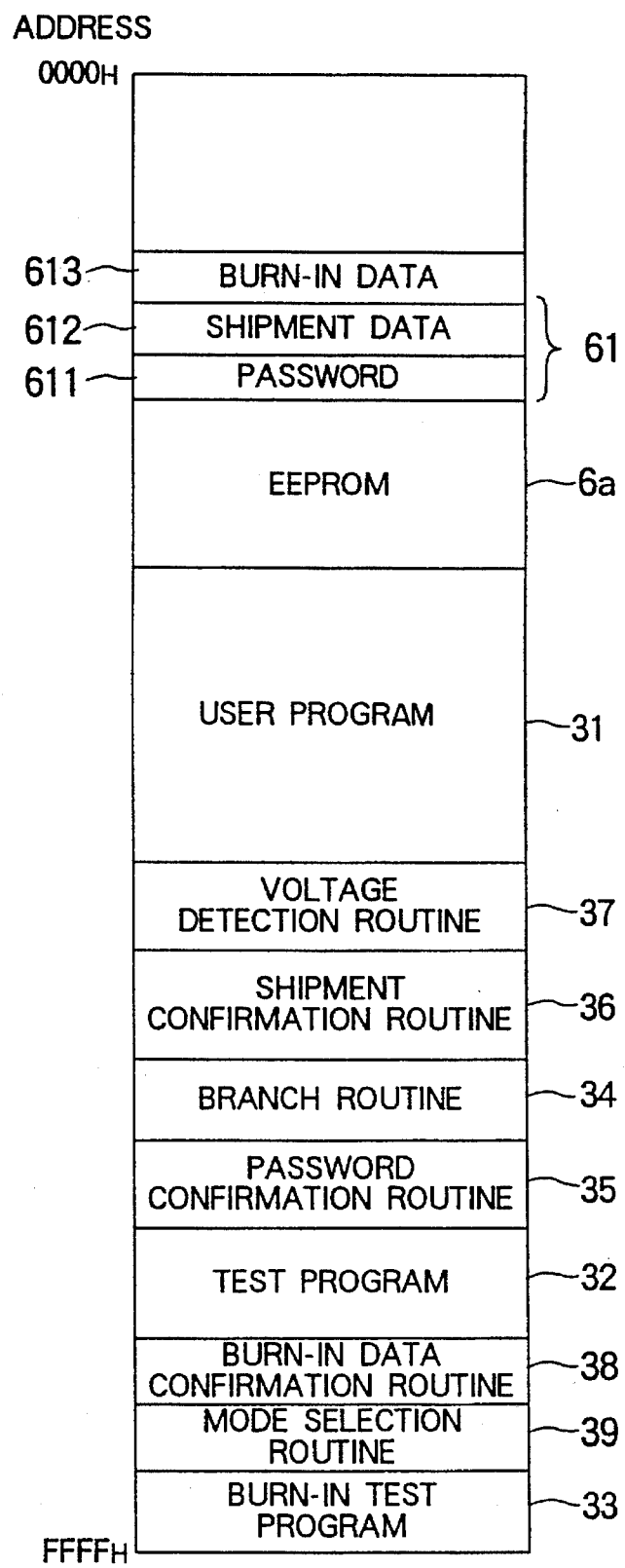
FIG. 12 illustrates a memory map for use at the time of executing a test program in the microcomputer for an IC card shown in FIG. 11.
Figure 13:
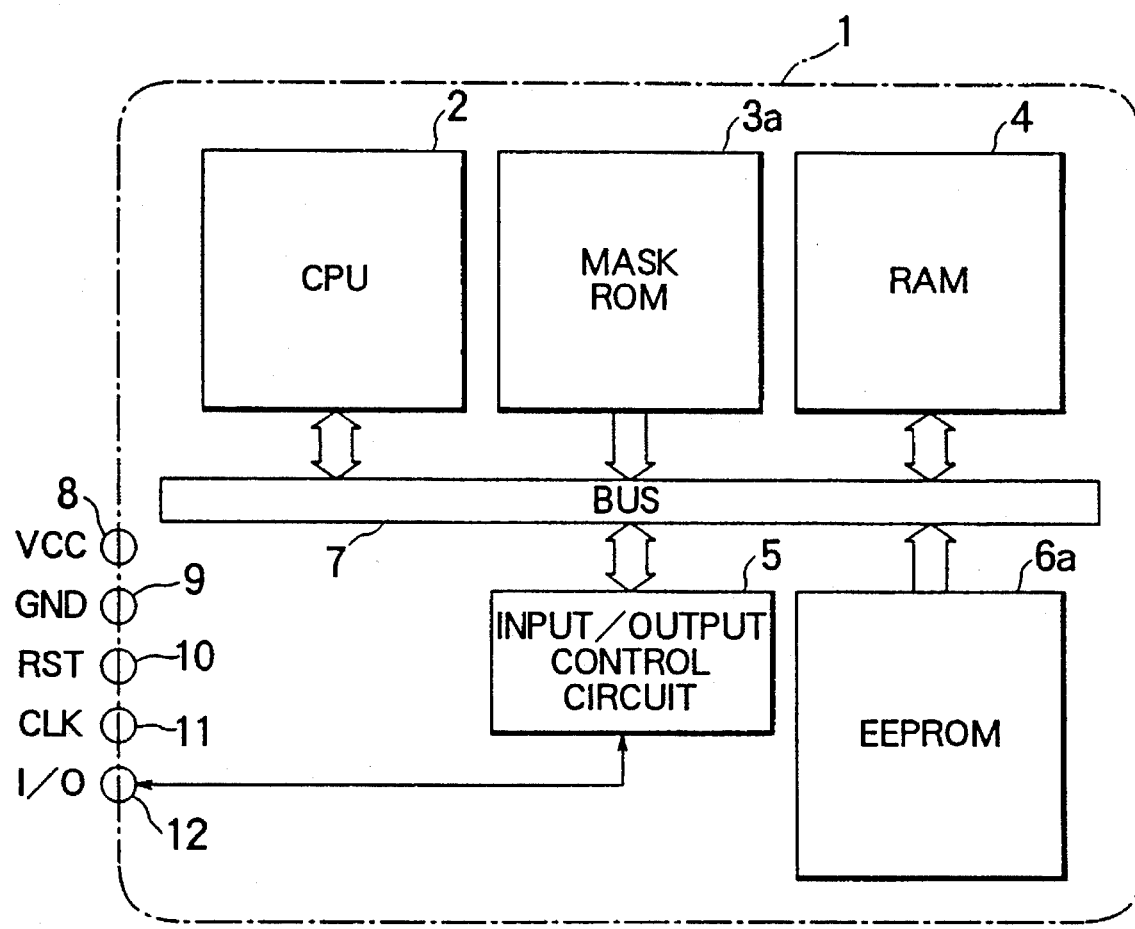
FIG. 13 is a functional block diagram that illustrates the functions of a conventional microcomputer for an IC card.
Figure 14:
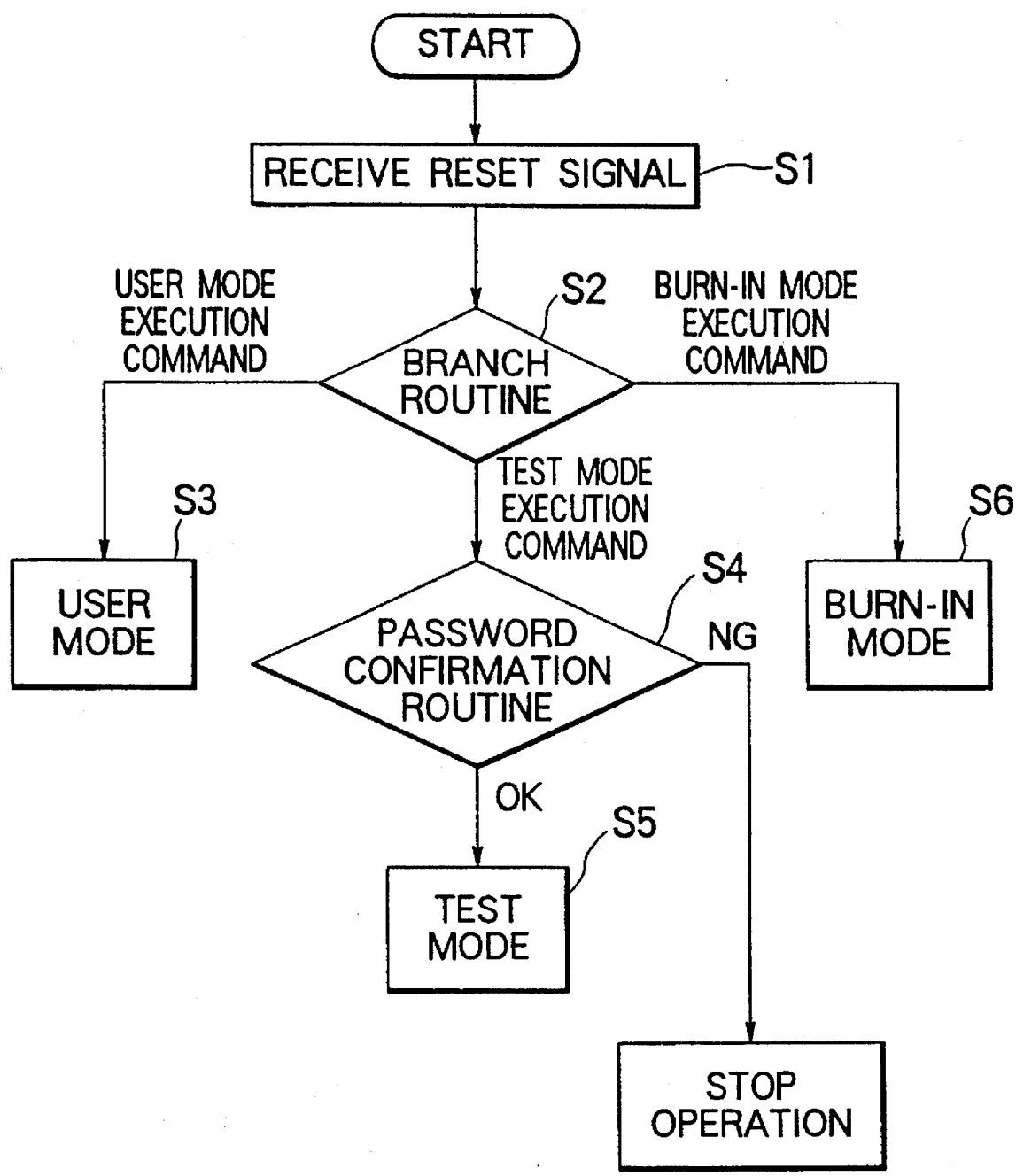
FIG. 14 is a flow chart that illustrates the operation of the conventional microcomputer for an IC card.
Figure 15A:
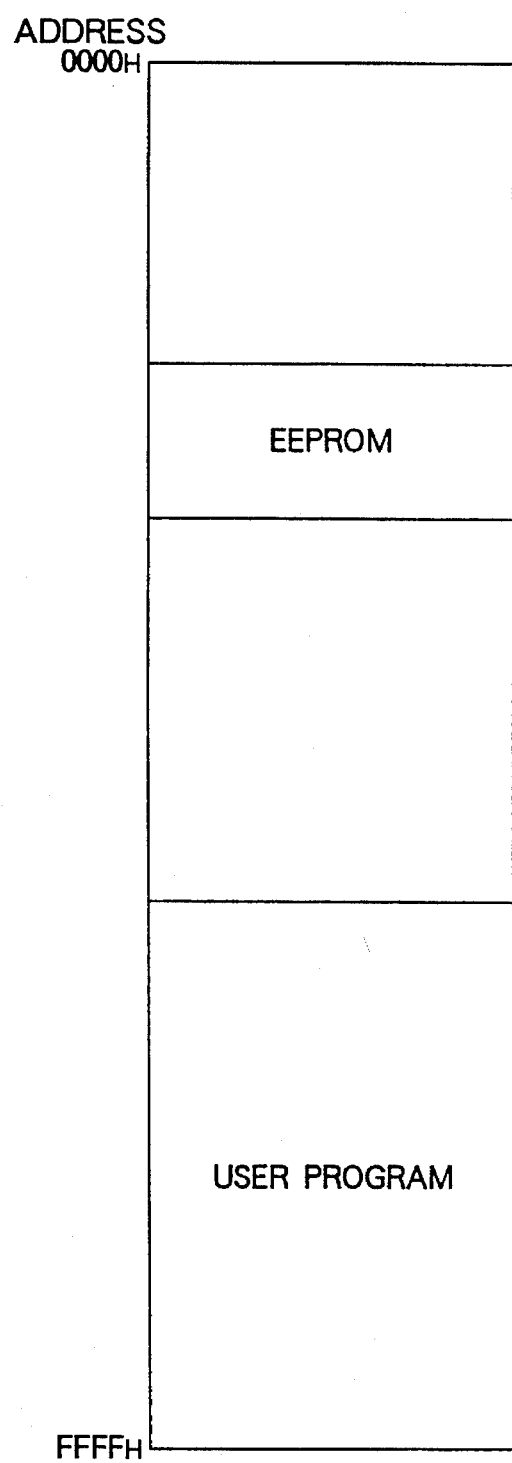
FIG. 15A illustrates a memory map for use at the time of executing a test program in the conventional microcomputer for an IC card.
Figure 15B:
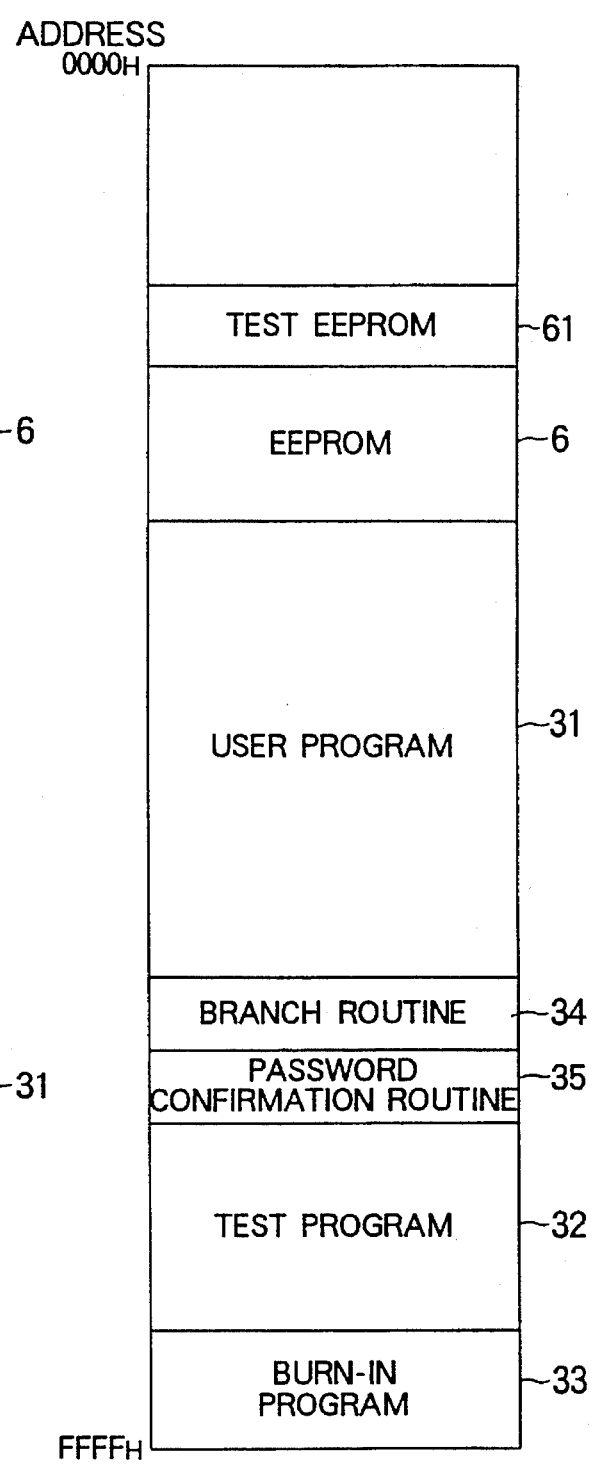
FIG. 15B is a view that illustrates a memory map for use at the time of executing a test program in the conventional microcomputer for an IC card.

FIG. 11 is a flow chart that illustrates the operation of the microcomputer for an IC card according to this embodiment. FIG. 12 is a memory map for use at the time of executing the test program in the microcomputer for an IC card. The functional block diagram for the microcomputer for an IC card according to this embodiment is the same as that shown in FIG. 4. In each of the drawings, the same reference numerals are given to the same elements as those according to the foregoing embodiments. In this embodiment, the shipment confirmation routine (step S2) and the voltage detection routine 37 (step S4) are performed before the branch routine 34 (step S5) is performed. Furthermore, the password confirmation routine (step S6) is performed before the test mode (step S7) is performed. The burn-in data confirmation routine (step S8) is performed before the burn-in mode (step S9) is performed. Further, the burn-in test program 33 to be executed in the burn-in mode (step S9) includes a discrimination signal output step (step S10) for generating a signal representing a mode that is being executed. The password 611, the shipment data 612, and the burn-in data 613 are written in the test EEPROM region 61 of the EEPROM 6a (see FIG. 12).

The operation will now be described briefly with reference to the flow chart in FIG. 11. Prior to the shipment of the microcomputer 1a for an IC card according to this embodiment or an IC card including the microcomputer 1a, the test mode (step S7) is commenced so that the test program 32 is executed and arbitrary shipment data 612 is written in the EEPROM region 61.

When a reset signal has been supplied through the RST terminal 10 after shipment has been made (step S1), the CPU 2 executes the shipment confirmation routine 36 (step S2) previously stored at a predetermined address in the mask ROM 3a. In the shipment confirmation routine 36, confirmation is made as to whether the shipment data 612 has been written in the test EEPROM region 61. If it has been written, branching to the user mode (step S3) takes place and branching to the test mode (step S7) and to the burn-in mode (step S8) are inhibited.

If the power supply voltage is too low although the shipment data 612 has been written in the test EEPROM region 61, an erroneous determination is made that the shipment data 612 has not been written in the shipment confirmation routine 36 (step S2). In this case, there is a possibility of branching to the branch routine 34 (step S5). Accordingly, the power supply voltage at the Vcc terminal 8 is detected by the voltage detection circuit 13 in the voltage detection routine (step S4). If the detected power supply voltage is lower than a predetermined voltage (low voltage), the determination made in the shipment confirmation routine 36 (step S2) is made invalid and branching to the user mode (step S3) takes place. As a result, execution of and access to the test program and the burn-in program can reliably be secured after shipment has been made.

If, for example, the burn-in mode (step S9) is performed before shipment, the burn-in data 613 is written in the test EEPROM region 61. If the fact that the burn-in data 613 has been written has been confirmed in the burn-in data confirmation routine (step S8), branching to the burn-in mode (step S9) is permitted so that the burn-in test program 33 is executed. In order to determine the existing mode from the read-only mode, the write mode, and the dummy write mode that is being executed in the burn-in mode (step S9), the mode determination signal is transmitted to the outside through the I/O terminal 12 in the discrimination signal output step (step S10). As a result, execution of the burn-in test program in accordance with an erroneous burn-in mode execution command is prevented. Further, execution and access to the burn-in test program can be secured. Moreover, the mode being executed in the burn-in mode (step S9) can be determined from the mode discrimination signal.

The foregoing embodiments including the sixth embodiment may be combined variously so that a microcomputer for an IC card having a plurality of desired functions can be realized.

As described above, a microcomputer according to the present invention is arranged so that the shipment data is written in the test EEPROM region before shipment and the shipment confirmation routine is performed before the branch routine is performed. Therefore, only the user program can be performed after shipment has been made. As a result, a reliable microcomputer for an IC card in which execution of and access to the test program and the burn-in test program are reliably secured is obtained.

According to the present invention, in addition, a voltage detection circuit for detecting the power supply voltage is included and the shipment confirmation routine and the voltage detection routine are performed before the branch routine is performed. Therefore, only the user program can be executed after shipment has been made even if the power supply voltage is low. As a result, an erroneous determination that can be made in the ship confirmation routine due to a reduction of the power supply voltage is prevented. As a result, a still more reliable microcomputer for an IC card is obtained.

According to another aspect of the present invention, the burn-in data confirmation routine is performed before branching to the burn-in test program takes place, when the burn-in mode execution command has been received, the burn-in data is written in the test EEPROM region before the burn-in test program is performed, and branching to the burn-in test is inhibited if the burn-in data has not been written in the test EEPROM region in the burn-in data confirmation routine. As a result, the burn-in test program cannot easily be executed and execution of the burn-in test program in accordance with an erroneous execution command is prevented. Therefore, a microcomputer for an IC card is obtained in which execution of and access to the burn-in test program is secured.

According to still another aspect of the present invention, the burn-in test program includes a discrimination signal output step in which a mode discrimination signal representing each mode is transmitted to the outside through the input/output terminal during execution of the respective modes. Therefore, the current mode can be determined from outside the card.

What is claimed is:

1. A microcomputer for an IC card comprising:

a mask ROM storing a user program, a test program, and a branch routine for selectively branching to the user and test programs in accordance with an execution command;

a CPU for processing data in accordance with the branch routine and the user and test programs stored in said mask ROM;

a RAM for temporarily storing data;

an EEPROM for storing data, having a plurality of memory locations, and including designated memory locations forming a test EEPROM region that cannot be accessed from the user program;

an input/output control circuit for controlling input of data to and output of data from said microcomputer;

terminals for establishing external electrical connections to said microcomputer; and a bus mutually connecting said mask ROM, said CPU, said RAM, said EEPROM, and said input/output circuit, wherein said mask ROM includes a shipment confirmation routine performed before the branch routine is performed, said test EEPROM region includes memory locations where shipment data representing whether said microcomputer has been shipped is written, and branching to the user program takes place without exception if confirmation has been made in the shipment confirmation routine that the shipment data has been written in the test EEPROM region.

2. The microcomputer for an IC card of claim 1 wherein said mask ROM stores a password confirmation routine, and wherein, if the shipment confirmation routine confirms that the shipment data has not been written, branching to the test program only occurs if the password confirmation routine determines that a valid password has been input through said input/output control circuit.

3. A microcomputer for an IC card comprising:

a mask ROM storing a user program, a test program, and a branch routine for selectively branching to the user and test programs in accordance with an execution command;

a CPU for processing data in accordance with the branch routine and the user and test programs stored in said mask ROM;

a RAM for temporarily storing data;

an EEPROM for storing data, having a plurality of memory locations, and including designated memory locations forming a test EEPROM region that cannot be accessed from the user program;

an input/output control circuit for controlling input of data to and output of data from said microcomputer;

terminals for establishing external electrical connections to said microcomputer; and a bus mutually connecting said mask ROM, said CPU, said RAM, said EEPROM, and said input/output circuit, wherein said terminals include a power source terminal;

voltage detection means for detecting whether a power supply voltage at said power source terminal has decreased, said mask ROM including, before the branch routine, a shipment confirmation routine and a voltage detection routine for detecting the power supply voltage at said power source terminal regardless of whether the shipment confirmation routine has been performed, said test EEPROM region includes a region in which shipment data representing that said microcomputer has been shipped is written, and branching to the user program takes place without exception when a decrease in the power supply voltage at said power source terminal has been detected in the voltage detection routine even if the shipment data has not been written in said test EEPROM region as determined in said shipment confirmation routine.

4. A microcomputer for an IC card comprising:

a mask ROM storing a user program, a test program, a burn-in test program, and a branch routine for selectively branching to the user, test, and burn-in test programs in accordance with an execution command;

a CPU for processing data in accordance with the branch routine and the user, test, and burn-in test programs stored in said mask ROM;

a RAM for temporarily storing data;

an EEPROM for storing data, having a plurality of memory locations, and including designated memory locations forming a test EEPROM region that cannot be accessed from the user program;

an input/output control circuit for controlling input of data to and output of data from said microcomputer;

terminals for establishing external electrical connections to said microcomputer; and a bus mutually connecting said mask ROM, said CPU, said RAM, said EEPROM, and said input/output circuit, wherein said mask ROM includes a burn-in data confirmation routine performed before branching to the burn-in test program takes place, said test EEPROM region includes memory locations where burn-in data indicating that the burn-in test program has been executed is written, and stopping operation of the microcomputer, without exception, if the burn-in data confirmation routine determines that the burn-in data has not been written in said test EEPROM region.

* * * * *